(12) United States Patent
Doshi et al.

(10) Patent No.: US 9,200,731 B2
(45) Date of Patent: Dec. 1, 2015

(54) THERMOPLASTIC MULTILAYER TUBES AND PROCESS FOR MANUFACTURING

(75) Inventors: Shailesh Ratilal Doshi, Kingston (CA); H. Chul Lee, Mississauga (CA)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 13/426,635

(22) Filed: Mar. 22, 2012

(65) Prior Publication Data

US 2012/0247602 A1  Oct. 4, 2012

Related U.S. Application Data

(60) Provisional application No. 61/468,283, filed on Mar. 28, 2011.

(51) Int. Cl.

| | |
|---|---|
| *F16L 11/04* | (2006.01) |
| *F16L 11/20* | (2006.01) |
| *B32B 27/34* | (2006.01) |
| *B32B 1/08* | (2006.01) |
| B29C 47/06 | (2006.01) |
| B29C 47/00 | (2006.01) |
| B29K 77/00 | (2006.01) |

(52) U.S. Cl.
CPC . *F16L 11/04* (2013.01); *B32B 1/08* (2013.01); *B32B 27/34* (2013.01); *B29C 47/0023* (2013.01); *B29C 47/065* (2013.01); *B29K 2077/00* (2013.01); *B29K 2077/10* (2013.01); *B32B 2250/02* (2013.01); *B32B 2250/24* (2013.01); *B32B 2597/00* (2013.01)

(58) Field of Classification Search
CPC ........ C08G 69/265; C08L 77/06; B65D 5/00; B60R 13/0861; B32B 2255/00; F16L 11/06; B29C 47/0023; B29C 47/065; B29C 2077/10; B29K 2077/00

USPC ............ 428/36.9, 36.91, 36.92, 474.7, 474.4, 428/35.7; 528/330, 331, 332; 524/607; D9/447; 206/524.1–524.9; 138/137, 138/140

See application file for complete search history.

(56) References Cited

U.S. PATENT DOCUMENTS

| | | | |
|---|---|---|---|
| 4,076,664 A | * | 2/1978 | Pagilagan .................. 528/339.3 |
| 4,174,358 A | | 11/1979 | Epstein |
| 2009/0017247 A1 | | 1/2009 | Bellet et al. |
| 2010/0233402 A1 | | 9/2010 | Doshi et al. |

FOREIGN PATENT DOCUMENTS

| | | | |
|---|---|---|---|
| EP | 1741553 | * | 1/2007 |
| WO | WO98/24847 | * | 6/1998 |
| WO | WO2005/102681 | * | 11/2005 |

\* cited by examiner

*Primary Examiner* — Yan Lan

(57) ABSTRACT

Disclosed is a multi-layer tube including:
A) a first layer including a first layer composition including
  a1) about 25 to 100 weight percent of a semi-aromatic polyamide whose repeat units consist essentially of about 60 to about 85 molar percent of repeat units of the formula

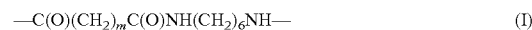

wherein m is 8 and/or 10, and about 15 to about 40 molar percent of repeat units of the formula

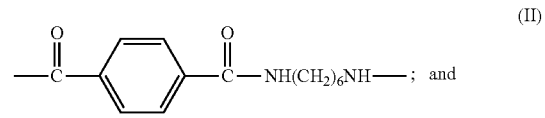

B) a second layer including a second layer composition including
  b1) 50 to 100 weight percent of poly(caprolactam);
with the proviso that the first layer and second layer are in direct contact; and the weight percents are based upon the total weight of the first layer composition and the second layer composition, respectively.

3 Claims, No Drawings

THERMOPLASTIC MULTILAYER TUBES AND PROCESS FOR MANUFACTURING

CROSS REFERENCE TO RELATED APPLICATION

This applications claims priority to U.S. Provisional Application No. 61/468,283, filed Mar. 28, 2011.

FIELD OF INVENTION

The present invention relates to the field of thermoplastic polyamide compositions useful in manufacturing multilayer tubes.

BACKGROUND OF INVENTION

Thermoplastic polymeric materials are used extensively in automotive vehicles and for other purposes. The automotive industry uses tubes and hoses for transporting refrigerants and compressed air.

For automotive applications hoses must be resistant to chemical attack from road salts; exhibit high flexibility, and at same time, must have high burst pressure resistance. Polyamide 11 and 12 have good resistance to salt solutions such as zinc chloride solutions and flexibility; but are expensive materials. PA 6 and PA 66 are less expensive and have high strength but they are very sensitive to chemical attack by salt solutions, and lack adequate flexibility. As a result a multi-layer construction of tubing typically is used to obtain the desired properties in automotive applications at an optimal cost.

Patent application EP 1378696 discloses a multilayer hose for compressed air comprising an inner layer made of PA 11 or PA 12, and outer layer made of a polyamide chosen from the same products as the inner layer and which can be the same or different, and at least one intermediate layer positioned between the inner layer and the outer layer chosen from blends of polyamide and polyolefin comprising a polyamide matrix, copolymers comprising polyamide blocks and polyether blocks, or blends of polyamides and of copolymers comprising polyamide blocks and polyether blocks.

Published U.S. Patent application 2009/0017247 discloses a multilayer hose for compressed air comprising: an outer layer made of polyamide (for instance PA12), optionally an intermediate layer of a polymer having a flexural modulus of less than 500 MPa, and inner layer of a polymer having a flexural modulus of greater than 1100 MPa (for instance PA6 or PA66). Intermediate layers are often used in the industry to obtain good bonding between two incompatible polyamide layers. However, the presence of intermediate layers result in an increase in the total number of layers in the multilayer hose or tubing and are economically less desirable than one requiring no bonding layers, US Patent Publication 2010/0233402 entitled "Salt Resistant Polyamide Compositions" discloses certain semi-aromatic copolyamides that exhibit improved chemical resistance especially to metal halides and salts compared to corresponding aliphatic homopolyamides. In these copolyamides, at least 15 mole percent of the repeat units are derived from monomers that comprise an aromatic structure. Thus, semi-aromatic copolyamides 612/6T comprising 20 to 30 mole percent 6T units exhibit improved salt resistance than corresponding homopolyamide PA 612.

Needed are multilayer tubing or hoses that have a combination of good salt resistance, high burst resistance, high flexibility and excellent interlayer adhesion without the use of intermediate adhesion or tie layers.

SUMMARY OF INVENTION

Disclosed is a multi-layer tube comprising:

A) a first layer comprising a first layer composition comprising a1) about 25 to 100 weight percent of a semi-aromatic polyamide whose repeat units consist essentially of about 60 to about 85 molar percent of repeat units of the formula

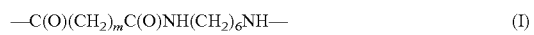

wherein m is 8 and/or 10, and about 15 to about 40 molar percent of repeat units of the formula

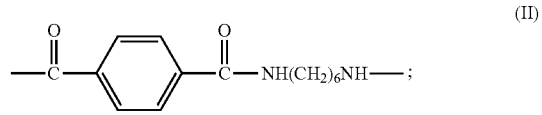

a2) 0 to 40 (preferably 10 to 30 weight percent and more preferred 10 to 25%) weight percent of polymeric toughener;

a3) 0 to 15 (preferred range 6 -12, and 6 to 9 weight percent) weight percent plasticizer; a4) 0 to 40 weight percent (5 to 35% and 5 to 30%) aliphatic homopolyamide having a repeat unit derived from an aliphatic diamine and aliphatic dicarboxylic acid, amino acid or lactam, wherein said aliphatic diamine, amino acid or lactam, have 6 or less carbon atoms;

a5) 0 to 5 of additives selected from the group consisting of colorants, antioxidants (hindered phenols, secondary aromatic amines), heat stabilizers (Copper iodide), light stabilizers, lubricants, and nucleants; and B) a second layer comprising a second layer composition comprising b1) 50 to 100 weight percent of poly(caprolactarn);

b2) 0 to 40 weight percent of polymeric toughener;

b3) 0 to 15 weight percent plasticizer;

b4) 0 to 5 of additives selected from the group consisting of colorants, antioxidants, heat stabilizers, light stabilizers, lubricants, and nucleants;

with the proviso that the first layer and second layer are in direct contact; and the weight percents are based upon the total weight of the first layer composition and the second layer composition, respectively.

Another embodiment is a method for providing a multi-layer tube comprising: coextruding melt blends of A) a first layer comprising a first layer composition as disclosed above; and B) a second layer comprising a second layer composition as disclosed above, with the proviso that the first layer and second layer are in direct contact; and the weight percents are based upon the total weight of the first layer composition and the second layer composition, respectively.

DETAILED DESCRIPTION

Herein melting points are as determined with differential scanning calorimetry (DSC) at a scan rate of 10° C./min in the first heating scan, wherein the melting point is taken at the maximum of the endothermic peak, and the heat of fusion in Joules/gram (J/g) is the area within the endothermic peak.

Polyamides disclosed herein are homopolymers or copolymers wherein the term copolymer refers to polyamides that have two or more amide and/or diamide molecular repeat units. The homopolymers and copolymers are identified by their respective repeat units. For copolymers disclosed herein, the repeat units are listed in decreasing order of mole % repeat units present in the copolymer. The following list exemplifies the abbreviations used to identify monomers and repeat units in the homopolymer and copolymer polyamides (PA):

HMD hexamethylene diamine (or 6 when used in combination with a diacid)
T Terephthalic acid
AA Adipic acid
DMD Decamethylenediamine
6∈ -Caprolactam
DDA Decanedioic acid
DDDA Dodecanedioic acid
I Isophthalic acid
MXD meta-xylylene diamine
TMD 1,4-tetramethylene diamine
4T polymer repeat unit formed from TMD and T
6T polymer repeat unit formed from HMD and T
DT polymer repeat unit formed from 2-MPMD and T
MXD6 polymer repeat unit formed from MXD and AA
66 polymer repeat unit formed from HMD and AA
10T polymer repeat unit formed from DMD and T
410 polymer repeat unit formed from TMD and DDA
510 polymer repeat unit formed from 1,5-pentanediamine and DDA
610 polymer repeat unit formed from HMD and DDA
612 polymer repeat unit formed from HMD and DDDA
6 polymer repeat unit formed from ∈ -caprolactam
11 polymer repeat unit formed from 11-aminoundecanoic acid
12 polymer repeat unit formed from 12-aminododecanoic acid Note that in the art the term "6" when used alone designates a polymer repeat unit formed from ∈ -caprolactam. Alternatively "6" when used in combination with a diacid such as T, for instance 6T, the "6" refers to HMD. In repeat units comprising a diamine and diacid, the diamine is designated first. Furthermore, when "6" is used in combination with a diamine, for instance 66, the first "6" refers to the diamine HMD, and the second "6" refers to adipic acid. Likewise, repeat units derived from other amino acids or lactams are designated as single numbers designating the number of carbon atoms.

Copolymer repeat units are separated by a slash (that is, /). For instance poly(hexamethylene dodecanediamide/hexamethylene terephthalamide) is abbreviated PA 61216T (75125), and the values in brackets are the mole % repeat unit of each repeat unit in the copolymer.

The first layer of the multilayer tube comprises a first layer composition comprising a1) about 25 to 100 weight percent, preferably about 35 to 90 weight percent and more preferably 40 to 70 weight percent, of a semi-aromatic polyamide whose repeat units consist essentially of about 60 to about 85 molar percent of repeat units, and preferably 68 to 82 molar percent, of the formula —C(O)(CH$_2$)$_m$C(O)NH(CH$_2$)$_6$NH— (I)

wherein m is 8 and/or 10, and about 15 to about 40 molar percent, and preferably about 18 to 32 molar percent, of repeat units of the formula

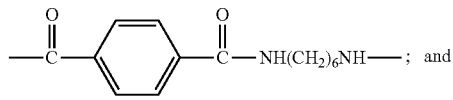
(II)

a4) 0 to 40 weight percent, preferably 5 to 35 weight percent and 5 to 30 ID weight percent, of an aliphatic homopolyamide having a repeat unit derived from an aliphatic diamine and aliphatic dicarboxylic acid, amino acid or lactam, wherein said aliphatic diamine, amino acid or lactam, have 6 or less carbon atoms. Preferably the aliphatic homopolyamide has a melting point of equal to or less than 280° C.

The synthesis, salt stress corrosion cracking (SSCC) and burst pressure resistance of the semi-aromatic polyamides useful in the first layer composition are disclosed in US Patent Publication 2010/0233402, herein incorporated by reference.

The aliphatic homopolyamide may be selected from the group consisting of PA 6, PA 66, PA 610, PA 612. The aliphatic homopolyamide may be PA610 or PA 612 and the aliphatic homopolyamide, if used in the first layer composition, may have the same repeat unit as that of formula (1) used in a1.

The ratio of a1:a4, that is, the semi-aromatic polyamide: aliphatic homopolyamide, in the first layer composition may be about 80:20 to about 40:60; about 80:20 to about 50:50; or about 80:20 to about 60:40.

The second layer of the multilayer tube comprises a second layer composition comprising 50 to 100 weight percent of poly(caprolactam).

The first layer composition and/or second layer composition may include 0 to 40 weight percent polymeric toughener, a2 and b2, respectively. Other embodiments may include 10 to 30 weight percent or 10 to 25 weight percent of polymeric toughener.

The polymeric toughener is a polymer, typically an elastomer having a melting point and/or glass transition points below 25° C., or is rubber-like, i.e., has a heat of melting (measured by ASTM Method D3418-82) of less than about 10 J/g, more preferably less than about 5 J/g, and/or has a melting point of less than 80° C., more preferably less than about 60° C. Preferably the polymeric toughener has a weight average molecular weight of about 5,000 or more, more preferably about 10,000 or more, when measured by gel permeation chromatography using polyethylene standards.

The polymeric toughener can be a functionalized toughener, a nonfunctionalized toughener, or blend of the two.

A functionalized toughener has attached to it reactive functional groups which can react with the polyimide. Such functional groups are usually "attached" to the polymeric toughener by grafting small molecules onto an already existing polymer or by copolymerizing a monomer containing the desired functional group when the polymeric tougher molecules are made by copolymerization. As an example of grafting, maleic anhydride may be grafted onto a hydrocarbon rubber, such as ethylene/propylene/diene copolymer or an olefinic copolymer, such as an ethylene/at-olefin copolymer using free radical grafting techniques. Herein an α-olefin is a straight chain olefin with a terminal double bond such as propylene, 1-hexene or 1-octene. The resulting grafted polymer has carboxylic anhydride and/or carboxyl groups attached to it.

Ethylene copolymers are an example of a polymeric toughening agent wherein the functional groups are copolymerized into the polymer, for instance, a copolymer of ethylene and a (meth)acrylate monomer containing the appropriate functional group. Herein the term (meth)acrylate means the compound may be either an acrylate, a methacrylate, or a mixture of the two. Useful (meth)acrylate functional compounds include (meth)acrylic acid, 2-hydroxyethyl(meth)acrylate, glycidyl(meth)acryate, and 2-isocyanatoethyl(meth)acrylate. In addition to ethylene and a functionalized (meth)acrylate monomer, other monomers may be copolymerized into such a polymer, such as maleic anhydride, vinyl acetate, unfunctionalized (meth)acrylate esters such as ethyl(meth)acrylate, n-butyl(meth)acrylate, i-butyl(meth)acrylate and cyclohexyl (meth)acrylate. Polymeric tougheners include those listed in U.S. Pat. No. 4,174,358, which is hereby incorporated by reference.

Another functionalized toughener is a polymer having carboxylic acid metal salts. Such polymers may be made by grafting or by copolymerizing a carboxyl or carboxylic anhydride containing compound to attach it to the polymer. Useful materials of this sort include Surlyn® ionomers available from E. I. DuPont de Nemours & Co. Inc., Wilmington, Del. 19898 USA, and the metal neutralized maleic anhydride grafted ethylene/α-olefin polymer described above. Preferred metal cations for these carboxylate salts include Zn, Li, Mg and Mn.

Polymeric tougheners useful in the invention include those selected from the group consisting of linear low density polyethylene (LLDPE) or linear low density polyethylene grafted with an unsaturated carboxylic anhydride, ethylene copolymers; ethylene/α-olefin or ethylene/α-olefin/diene copolymer grafted with an unsaturated carboxylic anhydride; core-shell polymers, and nonfunctionalized tougheners, as defined herein.

Herein the term ethylene copolymers include ethylene terpolymers and ethylene multi-polymers, i.e, having greater than three different repeat units, Ethylene copolymers useful as polymeric tougheners in the invention include those selected from the group consisting of ethylene copolymers of the formula E/X/Y wherein:

E is the radical formed from ethylene;
X is selected from the group consisting of radicals formed from

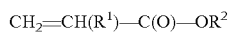

$CH_2=CH(R^1)-C(O)-OR^2$ wherein $R^1$ is H, $CH_3$ or $C_2H_5$, and $R^2$ is an alkyl group having 1-8 carbon atoms; vinyl acetate; and mixtures thereof; wherein X comprises 0 to 50 weight % of E/X/Y copolymer;

Y is one or more radicals formed from monomers selected from the group consisting of carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoesters and potassium, sodium and zinc salts of said preceding acids, glycidyl(meth)acrylate, 2-hydroxyethyl(meth)acrylate, 2-isocyanatoethyl(meth)acrylate and glycidyl vinyl ether; wherein Y is from 0.5 to 35 weight % of the E/X/Y copolymer, and preferably 0.5-20 weight percent of the E/X/Y copolymer, and E is the remainder weight percent and preferably comprises 40-90 weight percent of the E/X/Y copolymer.

It is preferred that the functionalized toughener contain a minimum of about 0.5, more preferably 1.0, very preferably about 2.5 weight percent of repeat units and/or grafted molecules containing functional groups or carboxylate salts (including the metal), and a maximum of about 15, more preferably about 13, and very preferably about 10 weight percent of monomers containing functional groups or carboxylate salts (including the metal). It is to be understood than any preferred minimum amount may be combined with any preferred maximum amount to form a preferred range. There may be more than one type of functional monomer present in the polymeric toughener, and/or more than one polymeric toughener. In one embodiment the polymeric toughener comprises about 2.5 to about 10 weight percent of repeat units containing functional groups or carboxylate salts (including the metal). In another embodiment, the polymeric toughener comprises about 0,5 to 1.5 weight percent functional monomers as grafted units.

It has been found that often the toughness of the composition is increased by increasing the amount of functionalized toughener and/or the amount of functional groups and/or metal carboxylate groups. However, these amounts should preferably not be increased to the point that the composition may crosslink (thermoset), especially before the final part shape is attained, and/or the first to melt tougheners may crosslink each other. Increasing these amounts may also increase the melt viscosity, and the melt viscosity should also preferably not be increased so much that extrusion or molding is made difficult.

Nonfunctionalized tougheners may also be present in addition to a functionalized toughener. Nonfunctionalized tougheners include polymers such as ethylene/α-olefin/diene (EPDM) rubber, polyolefins including polyethylene (PE) and polypropylene, and ethylene/a-olefin (EP) rubbers such as ethylene/1-octene copolymer, and the like such as those commercial copolymers under the ENGAGE® brand from Dow Chemical, Midland Mich. Other nonfunctional tougheners include the polystyrene, and the styrenic block copolymers including acrylonitrile-styrene copolymer, acrylonitrile-butadiene-styrene copolymer, styrene-isoprene-styrene copolymer, styrene-hydrogenated isoprene-styrene copolymer, styrene-butadiene-styrene copolymer, and styrene-hydrogenated butadiene-styrene copolymer. For example, acrylonitrile-butadiene-styrene, or ABS, is a terpolymer made by polymerizing styrene and acrylonitrile in the presence of polybutadiene. The proportions can vary from 15 to 35% acrylonitrile, 5 to 30% butadiene and 40 to 60% styrene. The result is a long chain of polybutadiene criss-crossed with shorter chains of polystyrene acrylonitrile).

Other polymeric tougheners useful in the invention are having a (vinyl aromatic comonomer) core comprising an ethylene copolymer as disclosed above, the core optionally cross-linked and optionally containing a vinyl aromatic comonomer, for instance styrene: and a shell comprising another polymer that may include polymethyl methacrylate and optionally contain functional groups including epoxy, or amine. The core-shell polymer may be made up of multiple layers, prepared by a multi-stage, sequential polymerization technique of the type described in U.S. Pat. No. 4,180,529. Each successive stage is polymerized in the presence of the previously polymerized stages. Thus, each layer is polymerized as a layer on top of the immediately preceding stage.

When used, the minimum amount of polymeric toughener is 0.5, preferably 6, and more preferably about 10 weight percent of the melt-blended thermoplastic composition, while the maximum amount of polymeric toughener is about 40 weight percent. It is to be understood than any minimum amount may be combined with any maximum amount to form a preferred weight range.

Useful polymeric tougheners include:
(a) A copolymer of ethylene, glycidyl(meth)acrylate, and optionally one or more (meth)acrylate esters.
(b) An ethylene/α-olefin or ethylene/α-olefinidiene (EPDM) copolymer grafted with an unsaturated carboxylic anhydride such as maleic anhydride.

(c) A copolymer of ethylene, 2-isocyanatoethyl(meth) acrylate, and optionally one or more (meth)acrylate esters.

(d) a copolymer of ethylene and acrylic acid reacted with a Zn, Li, Mg or Mn compound to form the corresponding ionomer.

The first layer composition and/or second layer composition may include 0 to 15 weight percent plasticizer; a3 and b3, respectively. Other embodiments may include 6-12 weight percent, and 6 to 9 weight percent plasticizer. The plasticizer will preferably be miscible with the polyamide. Examples of suitable plasticizers include sulfonamides, preferably aromatic sulfonamides such as benzenesulfonamides and toluenesulfonamides. Examples of suitable sulfonamides include N-alkyl benzenesulfonamides and toluenesufonamides, such as N-butylbenzenesulfonamide, N-(2-hydroxypropyl)benzenesulfonamide, N-ethyl-o-toluenesulfonamnide, N-ethyl-p-toluenesulfonamide, o-toluenesulfonamide, p-toluenesulfonamide, and the like. Preferred are N-butylbenzenesulfonamide, N-ethyl-o-toluenesulfonamide, and N-ethyl-p-toluenesulfonamide. A preferred plasticizer for the second layer composition is caprolactam monomer.

The plasticizer may be incorporated into the composition by melt-blending the polymer with plasticizer and, optionally, other ingredients, or during polymerization. If the plasticizer is incorporated during polymerization, the polyamide monomers are blended with one or more plasticizers prior to starting the polymerization cycle and the blend is introduced to the polymerization reactor. Alternatively, the plasticizer can be added to the reactor during the polymerization cycle.

The first layer composition and/or second layer composition may include 0 to 5 weight percent total additives, a5 and b4, respectively. The additives may include those selected from the group consisting of colorants; antioxidants such as hindered phenols and secondary aromatic amines, heat stabilizers such as copper salts; light stabilizers such as hindered amine light stabilizers (HALS); lubricants; and nucleants. Such additives can be added in conventional amounts according to the desired properties of the resulting material, and the control of these amounts versus the desired properties is within the knowledge of the skilled artisan.

The first layer composition and/or second layer composition may include 0 to 25 wt percent of a filler or a reinforcing agent based on the total weight of the first layer composition or second layer composition. The filler could be a mineral filler such as talc, mica, clay, CaCO3 or TiO2. The reinforcing agent could be filament such as glass fibers.

When present, additives, fillers and reinforcing agents, may be incorporated into the polyamide composition used in the present invention by melt-blending using any known methods. The component materials may be mixed to homogeneity using a melt-mixer such as a single or twin-screw extruder, blender, kneader, Banbury mixer, etc. to give a polyamide composition. Or, part of the materials may be mixed in a melt-mixer, and the rest of the materials may then be added and further melt-mixed until homogeneous.

Optional braided layers for reinforcement of the multilayer tube include polyester, Kevlar® aramid fiber and steel wire. The braided layers can be an outer layer or inner layer of the multilayer tube.

Preferably the first layer of the multilayer tube is an outer layer and the second layer of the tube is an inner layer. Alternatively, for some applications the first layer of the multilayer tube may be the inner layer and the second layer of the tube may be the outer layer.

Further provided is a method for providing a multilayer tube comprising:

Coextruding Melt Blends of

A) a first layer comprising a first layer composition comprising a1) about 25 to 100 weight percent of a semi-aromatic polyamide whose repeat units consist essentially of about 60 to about 85 molar percent of repeat units of the formula $$-C(O)(CH_2)_m C(O)NH(CH_2)_6 NH- \quad (I)$$

wherein m is 8 and/or 10, and about 15 to about 40 molar percent of repeat units of the formula

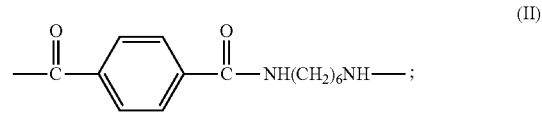

a2) 0 to 40 weight percent of polymeric toughener;

a3) 0 to 15 (preferred range 6-12, and 6 to 9 weight percent) weight percent plasticizer;

a4) 0 to 40 weight percent aliphatic homopolyamide having a repeat unit derived from an aliphatic diamine and aliphatic dicarboxylic acid, amino acid or lactam, wherein said aliphatic diamine, amino acid or lactam, have 6 or less carbon atoms;

a5) 0 to 5 of additives selected from the group consisting of colorants, antioxidants, heat stabilizers, light stabilizers, lubricants, and nucleants; and B) a second layer comprising a second layer composition comprising b1) 50 to 100 weight percent of poly(caprolactam);

b2) 0 to 40 weight percent of polymeric toughener;

b3) 0 to 15 weight percent plasticizer;

b4) 0 to 5 of additives selected from the group consisting of colorants, antioxidants, heat stabilizers, light stabilizers, lubricants, and nucleants;

with the proviso that the first layer and second layer are in direct contact; and the weight percents are based upon the total weight of the first layer composition and the second layer composition, respectively.

Other embodiments of the method include the variation in a1) thru a5) and b1) thru b4) as disclosed for the embodiments of the multi-layer tube.

In this invention as claimed the term "in direct contact" means that there is no or substantially no other material, such as an adhesive layer or tie layer, separating the first layer and second layer. By this we mean that the first and second layers are sufficiently contacted so that they adhere together along the length thereof; this notwithstanding, it is possible to include a material interposed between these first and second layers without departing from the spirit and scope of the invention. These first and second layers provide an interface that has a significant improvement in adhesion versus other known multilayer tubes comprising polyamide 6 layers. The coextruding process extrudes melt blends of the first layer composition and the second layer composition, the layers are bonded in the melt.

Coextruding the first layer composition in direct contact with the second layer composition comprising poly(caprolactam) eliminates the need for an adhesive or a tie layer. The coextrusion process herein disclosed is simplified, as compared to a coextrusion process including a tie layer and the cost of the tie layer material is eliminated. The tie layer material, when used; is often not capable of enduring high temperatures, and thus limits the maximum temperature at which the multi-layer tube can perform. By eliminating the tie layer, the temperature performance of the multi-layer tube is also improved.

The extruded thermoplastic tubes provided by the process disclosed herein may have application in many vehicular, industrial and consumer product components that meet one or more of the following requirements: resistance against road salts, hydrolysis by water and coolants such as glycol solutions, fuels, alcohols, oils, chlorinated water; high impact resistance especially under cold environment; and significant weight reduction as compared to conventional metals or rubber hoses. Specific extruded thermoplastic tubes are selected from the group consisting of automotive coolant lines, fuel lines, oil lines, truck air brake tubes.

The present invention is further illustrated by the following examples. It should be understood that the following examples are for illustration purposes only, and are not used to limit the present invention thereto.

Methods

Compounding Method

Melt blends of the first layer composition were prepared by melt blending in a 25 mm W&P twin screw extruder with 9 barrel segments. The extruder was provided with twin screws that incorporated kneading and mixing elements in an upstream melting zone and a downstream melt blending zone. All the polymer pellets and additive powders were preblended and fed at the main feedport of the extruder at a rate of nominally 300 gm/min. When present, plasticizer was injected at roughly halfway point down stream into the premelted blend. Barrels were heated to a desired temperature profile of 200°C. at the feedport to a temperature ranging from 240-250° C. at the front end. The screw rpm was generally 300. Vacuum venting was provided just downstream of the melt blending zone to vent off volatiles. The melt was extruded through a two hole die and was pelletized into granules.

Pellets of the second layer composition were sourced commercially.

The pelletized blends were injection molded into test pieces per ASTM D638 (type IV) and ASTM 0790 specifications for characterizing tensile and flexural properties using a 180 ton Nissei injection molding machine. For molding a barrel temperature profile of 220 C-240° C. was used, the mold temperature being 70° C.

Tensile properties (yield stress and elongation at break) were measured per ASTM 0638 specification on an Instron Tensile tester model 4469 at a crosshead speed of 50 mm/min. Flexural modulus was measured by 3 point method per ASTM 0790 specification on the same tester with a support span of 50 mm and a crosshead speed of 1.3 mm/min.

Materials

Polyamides

The following procedure was used to prepare PA 612/6T 75/25 in an autoclave with 1200 kg nominal polymer capacity.

Polyamide 612 salt solution of approximately 45 weight percent concentration was prepared from hexamethylene diamine and dodecanedioic acid in water and adjusted to a pH of 7.6±0.1. Polyamide 6T salt solution of approximately 25 weight percent was prepared from hexamethylene diamine and terephthalic acid in water and adjusted to a pH of 8.7±0.1. A 45 wt % polyamide 612 salt solution (1927 kg), a 25 wt % polyamide 6T salt solution (937 kg), 8300 g of an aqueous solution containing 80 weight percent hexamethylene diamine, 248 g of an aqueous solution containing 10 wt % of Carbowax 8000 and 3106 g of glacial acetic acid were charged to an evaporator. The salt solution was then concentrated to approximately 70 wt % and then charged into an autoclave. Sodium hypophosphite (34 g) dissolved in 3 liters of water was also added to the autoclave via additive pot. The salt solution in the autoclave was then heated while the pressure was allowed to rise to 1.72 MPa (250 psi) at which point steam was vented to maintain the pressure at 1.72 MPa and heating was continued until the temperature of the batch reached 250° C. The pressure was then reduced slowly to reach in the range of 55-69 kPa (absolute) (8-10 psia), while the batch temperature was allowed to further rise to 265-275° C. The pressure was then held around 69 kPa (absolute) (10 psia) and the temperature was held at 265-275° C. for about 20 min. Finally, the polymer melt was extruded into strands, cooled, and cut into pellets. The copolyamides had an IV in the range of 1.2 to 1.4, For making other PA612/6T compositions, the quantities of polyamide 612 and polyamide 6T salt solutions were adjusted to achieve the desired acid molar ratio. For making other PA610/6T compositions, the quantities of polyamide 610 and polyamide 6T salt solutions were adjusted to achieve the desired acid molar ratio.

PA 612/6T (75125) is a copolyamide with 75 mole % repeat units 612 and 25 mole % repeat units 6T.

PA 612/6T (70/30) is a copolyamide with 70 mole % repeat units 612 and 30 mole % repeat units 6T.

PA 610/6T (80/20) is a copolyamide with 80 mole % repeat units 610 and 20 mole % repeat units 6T.

PA 61016T (60/40) is a copolyamide with 60 mole % repeat units 610 and 40 mole % repeat units 6T.

PA 612 is Zytel® 158 resin available from E.I. DuPont de Nemours and Company, Wilmington, Del., USA.

PA 610 is Zytel® RS LC 3090 resin available from E.I. DuPont de Nemours and Company, Wilmington, Del., USA.

PA 12 resin is commercially available as Grilamid L25FVS40 from EMS-Grivory AG, Domat, Switzerland.

PA 6 T1 is an impact modified poly(caprolactam) commercially available as Zytel® 7300T PA6 T2 is an impact modified poly(caprolactam) including about 5 weight percent of a functionalized styrene-ethylene-butadiene-styrene (SEBS) block polymeric toughener and about 5 weight percent of (SEBS) block polymeric toughener, Polymeric Tougheners PT-1 refers to a linear low density polyethylene (LLDPE) with S.C. of 0.918 and MI of 2 gm/10 min @ 190 C, commercially available as Exxon LLDPE 1002.09

PT-2 refers to maleic anhydride grafted LLDPE, available as Fusabond® MB 226D resin available from El. DuPont de Nemours and Company, Wilmington, Del., USA.

PT-3 refers to an ethylene-octene copolymer with 72 wt % ethylene and 28 wt % 1-octene commercially available as Engage® 8180 resin from Dow Chemicals.

PT-4 refers to maleic anhydride grafted ethylene-octene copolymer, available as FusabondN493 resin available from E.I. DuPont de Nemours and Company, Wilmington, Del., USA.

PT-5 refers to 0.9 wt % maleic anhydride grafted ethylene-propylene-norbornene copolymer (70:29.5:0.5 weight ratio), commercially available as Nordel® 3745P resin.

Additives

Plasticizer is n-butyl benzene sulfonamide plasticizer available as Uniplex® 214 plasticizer from Unitex Chemicals Corporation, Greensboro, N.C.

Akrochem® 383 SWP antioxidant is a hindered phenol available from Akron Chemicals.

Naugard® 445 hindered amine refers to 4,4° di(α,α-dimethylbenzyl)diphenylamine available commercially from Uniroyal Chemical Company, Middlebury, Conn.

Irgafos® 168 is a phosphate anti-oxidant from BASF

HS 7:1:1 is a copper based polyamide heat stabilizer with 7:1:1 parts by weight of KI:CuI:Al distearate.

C-Black MB is a 45 weight percent carbon black colorant in an ethylene/methacrylic acid copolymer, commercially available from Ampacet Corporation, Tarrytown, N.Y.

Layer compositions used in the Examples and their physical properties are listed in Table 1.

TABLE 1

Physical Properties of Layer Compositions.

| | Composition | | | | | |
|---|---|---|---|---|---|---|
| | A | B | C | PA 12 | PA 6 T1 | PA 6 T2 |
| PA 612/6T (75/25) (wt %) | | | 42.7 | | | |
| PA 612/6T (70/30) (wt %) | 48.8 | 46.2 | | | | |
| PA 612 (wt %) | 26.3 | 24.9 | 28.4 | | | |
| PA 6 T1[2] | | | | | 100 | |
| PA 6 T2[2] | | | | | | 100 |
| PA 12[2] | | | | 100 | | |
| PT-1 (wt %) | | 12.5 | 12.5 | | | |
| PT-2 (wt %) | | 10 | 10 | | | |
| PT-3 (wt %) | 7.5 | | | | | |
| PT-4 (wt %) | 7.5 | | | | | |
| PT-5 (25%) | | | 2.5 | 2.5 | | |
| Plasticizer (wt %) | 6 | | | | | |
| C-Black MB (wt %) | 2 | 2 | 2 | | | |
| Stabilizer package[1] | 1.9 | 1.9 | 1.9 | | | |
| Physical properties | | | | | | |
| Yield Stress (MPa) | 38 | 41 | 43 | 44 | 48 | 68 |
| Flexural Modulus (MPa) | 970 | 1300 | 1350 | 413 | 1700 | 2750 |
| Elongation @ Break (%) | 200 | 190 | 180 | 280 | >50 | >50 |

[1]Stabilizer package consists of 0.5 wt % Akrochem 383SWP, 0.5 wt % Naugard 445, 0.5 wt % Irgafos 168, and 0.4 wt % HS 711.
[2]Properties listed are per datasheets available manufacturer.

EXAMPLES 1-6

Examples 1-6, listed in Table 2, illustrate the coextrusion of two layer tubes comprising an outer layer and inner layer. The nominal tube OD was 8 mm, and wall thickness was 0.8 mm with ratio of inner and outer layers nominally 1:1.

A three extruder tube coextrusion configuration was used consisting of a 32 mm Polysystems extruder, a 25 mm Barmag extruder and 16 mm Randcastle extruder. A coextrusion the with 14 mm body×11.5 mm ID, and a plate type vacuum sizer with 9 mm ID were used. A Killion PVT3 vacuum tank and a Connair puller were used. Two layer tubes were made with Polysystems extruder feeding the melt for the outer layer and both Barmag and Randcastle extruders feeding identical compositions for the inner layer. The temperature from the feedport, nominally 195° C., increased to about 230° C. at the end. Tubes were extruded with nominally 8 mm OD×0.8 mm wall at a line speed of 3.7 m/min and sized to the above dimensions with 50 mm water vacuum in the quench tank.

Adhesion was assessed by cutting 125 mm long×6 mm wide strips from the tubes, and manually pulling the layers apart.

The adhesion results in Table 2 indicate that the Examples 1-6, wherein Compositions A-C, comprising PA 612/6T (70130), are directly melt-bonded to a second layer comprising PA 6 and exhibit excellent adhesion without the use of an adhesive or tie layer. Comparative Example C1 shows that PA 12 directly bonded to a second layer comprising PA6 shows no adhesion.

TABLE 2

Examples and Comparative Examples of Two layer Tubes

| Example | First layer (Outer) Composition | Second layer (Inner) Composition | Adhesion Assessment |
|---|---|---|---|
| E1 | A | PA 6 T1 | Strong adhesion |
| E2 | A | PA 6 T2 | Strong adhesion |
| E3 | B | PA 6 T1 | Strong adhesion |
| E4 | B | PA 6 T2 | Strong adhesion |
| E5 | C | PA 6 T1 | Strong adhesion |
| E6 | C | PA 6 T2 | Strong adhesion |
| C1 | PA 12 | PA 6 T1 | No adhesion - layers fall part |

Strong adhesion = not possible to pull layers apart.

The invention claimed is:

1. A multi-layer tube comprising:
   A) a first layer comprising a first layer composition comprising
      a1) about 35 to 90 weight percent of a semi-aromatic polyamide whose repeat units consist essentially of about 60 to about 85 molar percent of repeat units of the formula —C(O)(CH$_2$)$_m$C(O)NH(CH$_2$)$_6$NH—tm (I)

wherein m is 8 and/or 10, and about 15 to about 40 molar percent of repeat units of the formula

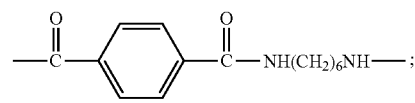

(II)

a2) 0 to 40 weight percent of polymeric toughener;
   a3) 0 to 15 weight percent plasticizer;
   a4) 5 to 35 weight percent aliphatic homopolyamide having a repeat unit derived from an aliphatic diamine and aliphatic dicarboxylic acid, amino acid or lactam, wherein said aliphatic diamine, amino acid or lactam, have 6 or less carbon atoms;
   a5) 0 to 5 of additives selected from the group consisting of colorants, antioxidants, heat stabilizers, light stabilizers, lubricants, and nucleants;
   wherein the ratio of a1 :a4 in the first layer composition is about 80:20 to about 50:50; and
   B) a second layer comprising a second layer composition comprising
   b1) 50 to 100 weight percent of poly(caprolactam);
   b2) 0 to 40 weight percent of polymeric toughener;
   b3) 0 to 15 weight percent plasticizer;
   b4) 0 to 5 of additives selected from the group consisting of colorants, antioxidants, heat stabilizers, light stabilizers, lubricants, and nucleants;
   with the proviso that the first layer and second layer are in direct contact; and the weight percents are based upon the total weight of the first layer composition and the second layer composition, respectively; and
   wherein the first layer (A) of the multilayer tube is an outer layer and the second layer (B) of the mufti-layer tube is an inner layer.

2. The multi-layer tube of claim 1 wherein the semi-aromatic polyamide repeat units consist essentially of about 68 to about 82 molar percent of formula (I) and about 18 to 32 molar percent, of repeat units of the formula (II).

3. The multi-layer tube of claim 1 wherein m is 10.

* * * * *